United States Patent [19]

Tachibana

[11] Patent Number: 5,023,536
[45] Date of Patent: Jun. 11, 1991

[54] SERVO-CONTROLLER

[75] Inventor: Miyuki Tachibana, Nagasaki, Japan

[73] Assignee: Mitsubishi Denki Kabushiki Kaisha, Tokyo, Japan

[21] Appl. No.: 377,112

[22] Filed: Jul. 7, 1989

[30] Foreign Application Priority Data

Jul. 7, 1988 [JP] Japan .................................. 63-169620

[51] Int. Cl.⁵ .............................................. G05B 1/02
[52] U.S. Cl. .................................. 318/638; 318/652; 318/681
[58] Field of Search .............. 318/560, 563, 569, 600, 318/601, 604, 628, 637, 638, 652, 663, 671, 677, 681

[56] References Cited

U.S. PATENT DOCUMENTS

| | | | |
|---|---|---|---|
| 3,736,486 | 5/1973 | Gould et al. | 318/681 X |
| 3,795,851 | 3/1974 | Gage et al. | 318/604 X |
| 4,238,143 | 12/1980 | Shenk | 318/601 X |
| 4,250,441 | 2/1981 | Chapman et al. | 318/663 X |
| 4,263,539 | 4/1981 | Barton | 318/663 X |
| 4,374,423 | 2/1983 | Kundler et al. | 318/563 X |
| 4,491,112 | 1/1985 | Kanegae et al. | 123/479 |
| 4,712,053 | 12/1987 | Numata | 318/663 X |
| 4,785,224 | 11/1988 | Pfalzgraf et al. | 318/663 |

FOREIGN PATENT DOCUMENTS

| | | |
|---|---|---|
| 0188109 | 7/1986 | European Pat. Off. . |
| 8606318 | 11/1986 | PCT Int'l Appl. . |
| 2006475 | 5/1979 | United Kingdom . |
| 2176633 | 12/1986 | United Kingdom . |

Primary Examiner—Bentsu Ro
Attorney, Agent, or Firm—Oblon, Spivak, McClelland, Maier & Neustadt

[57] ABSTRACT

A deviation comparator (10) compares an output signal of a deviation detector (6) with a set limit value to anticipates a runaway, and if the runaway is judged thereby, an object unit (12) is isolated by a switch circuit (11), thereby to prevent destruction of a driving amplifier (9) and the object unit (12).

8 Claims, 2 Drawing Sheets

SERVO-CONTROLLER

FIELD OF THE INVENTION AND RELATED ART STATEMENT

1. Field of the Invention

The present invention relates to a servo-controller for controlling a position of a moving part of a system, and specially to an apparatus suitable for use in an image scanner or the like apparatus when a unit to be controlled in the system is moved to a target position.

2. Description of the Related Art

The conventional servo-controller, for instance, in an image scanner has been used as the position controller for controlling a movable camera. The conventional servo-controller comprises: a target-setting unit for setting a target position for the camera as an object unit to be controlled: a position detector for finding a present position of the camera; a deviation detector for detecting the deviation between the output signal of the target-setting unit and the output signal of the position detector; a drive circuit for receiving the output signal of the deviation detector, and for passing the driving signal to the camera in accordance with the output signal of the deviation detector.

In such a conventional servo-controller, when the camera as the object unit to be controlled is positioned at a target position, in the stable state both of the output signals of the target-setting unit and the position detector become the same signal. Accordingly, the output signal of the deviation detector becomes 0, and the output signal of the drive circuit also becomes 0. But in the case where the camera in the system of the stable state is made to start toward the other target position, a new target position data is issued from the target-setting unit. As a result, the deviation detector issues the output signal, and the drive circuit issues the corresponding driving signal to drive the camera. Finally, the driving of the camera is stopped when the output of the deviation detector becomes 0. Namely, the operation of the camera is continued until the camera arrives just at the predetermined target position.

The above-mentioned conventional servo-controller has the following problems: in the case where the servo-controller is in an abnormal state such as at a position over a limit of control, for example, when a present-position data of the camera is not fed back to the position detector, or when an abnormal signal, e.g. a high voltage is passed to the camera so that the drive circuit is out of order, the servo-controller will become in a runaway, making the system uncontrollable.

OBJECT AND SUMMARY OF THE INVENTION

It is an object of the present invention to provide a servo-controller capable of preventing runaway in the servo-controller through anticipation of the runaway in advance.

The servo-controller in accordance with the present invention comprises, a target-setting means for setting a target value for an object unit to be controlled, a position detecting means which produces a position feed-back signal by detecting the present value of the object unit, a deviation detecting means for produces a deviation signal by comparing the position feed-back signal with the target value, a driving means for driving the object unit by utilizing the deviation signal as its control signal, a comparator for comparing the deviation signal with a predetermined set limit value, and to stop the operation of the driving means when the signal of deviation more than the predetermined set limit value is received.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

In the following, a servo-controller embodying the present invention is elucidated with reference to the drawings of FIG. 1 and FIG. 2.

Figure 1:
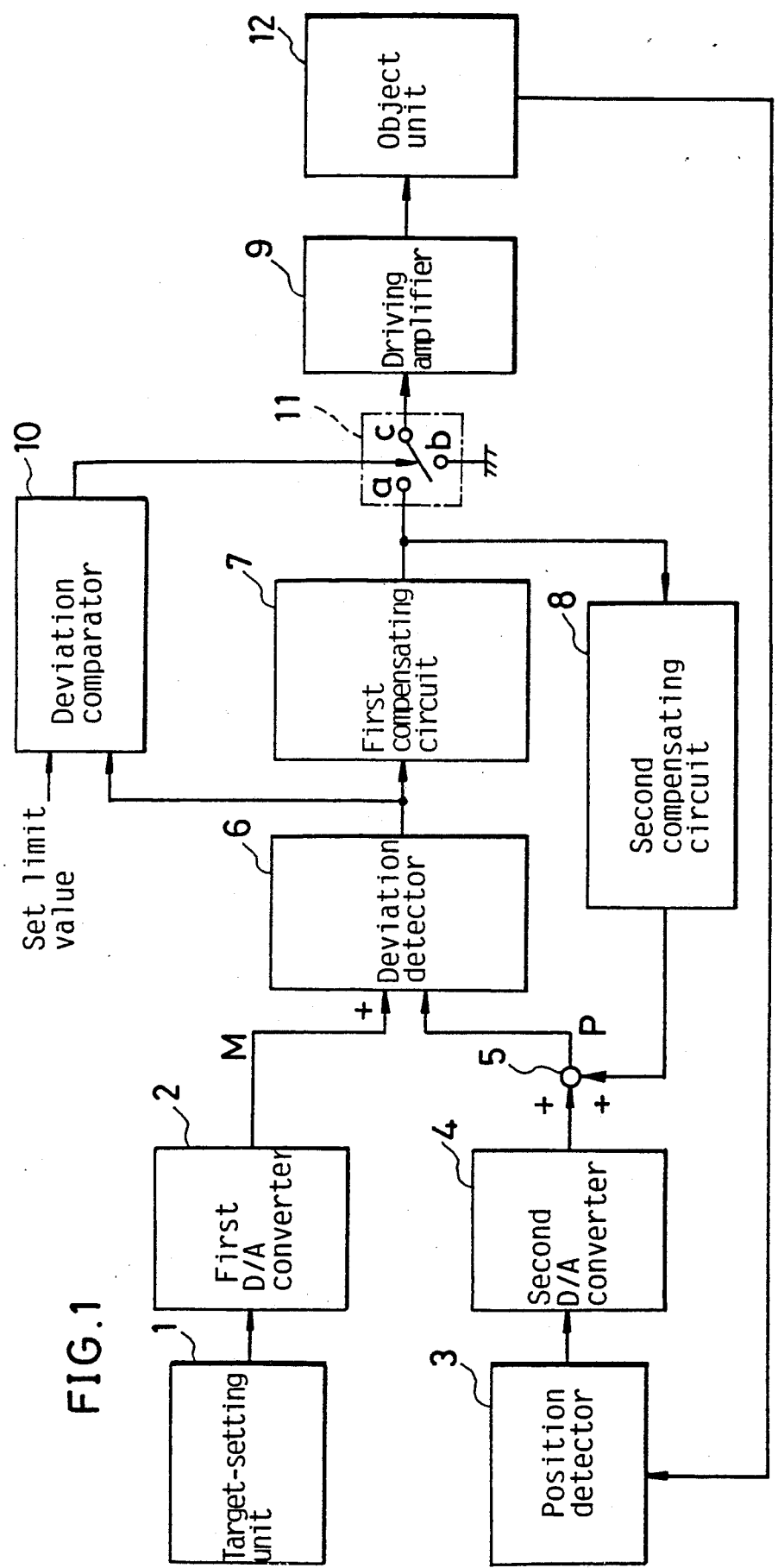
FIG. 1 is a block diagram of a preferred embodiment of a servo-controller of the present invention.
Figure 2:
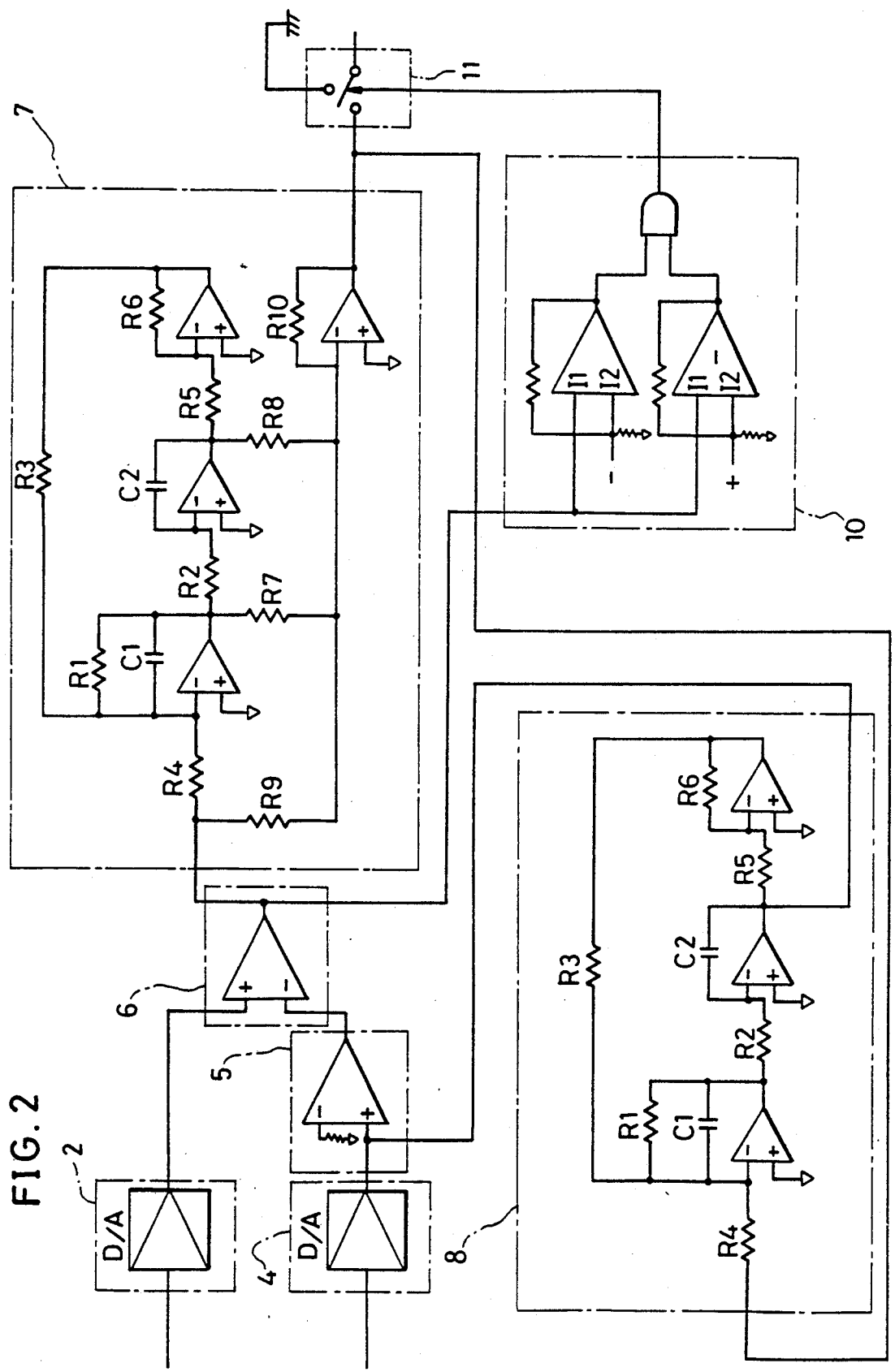
FIG. 2 is a circuit diagram which may be employed by the apparatus of FIG. 1.

FIG. 1 is a block diagram of a preferred embodiment of the servo-controller of the present invention, and FIG. 2 is a concrete electric circuit of the servo-controller embodying the present invention. The servo-controller of the present invention is used as a control system in an image scanner. An object unit 12 is a movable unit in the image scanner and has a sensor unit therein. A target-setting unit 1 sets a target position and gives corresponding digital data of 12 bits for the set target position to a first digital/analog converter 2. Thus, the image scanner can read a picture by 4096 steps. The first D/A converter 2 converts the digital data for the target position into analog data. A position detector 3 finds a present position indicated by the digital data of the object unit 12. A second digital/analog converter 4 converts the output signal of the position detector 3 into an analog signal. The output signal of the second D/A converter 4 and the output signal of a second compensation circuit 8 mentioned afterward are added to each other in an analog adder 5. A deviation detector 6 finds the deviation between the output signal of the first D/A converter 2 and the output signal of the analog adder 5. A first compensation circuit 7 issues a driving signal which is compensated basing on the output signal of the deviation detector 6 for frequency characteristics and to decrease the offset value in the system. A lead-lag filter and a lag-lead filter are used in the first compensation circuit 7. The output signal of the first compensation circuit 7 is passed to the switch 11 and to the second compensation circuit 8. The driving signal of the first compensation circuit 7 is passed to the driving amplifier 9 for operating the object unit 12 to be controlled through the switch 11. The function of the second compensation circuit 8 is to remove the noise of high-frequency ripple that is issued in the first compensation circuit 7. A deviation comparator 10 compares the output signal of the deviation detector 6 with the high and low predetermined set limit values as the limit value for controlling the object unit 12. And, if the output signal of the deviation detector 6 is more than the limit value, the deviation comparator 10 issues a cutoff signal. The cut off signal is passed to a switch 11. The switch 11 is operated by the cutoff signal issued from the deviation comparator 10. In other words, when the servo-control system is in the stable state, the output signal of the first compensation circuit 7 is passed to the driving amplifier 9. And, if the abnormal state is in the system, the switch 11, operated by the cutoff signal, isolates the driving amprifier 9 from the first compensation circuit 7.

The operation of the above-mentioned servo-controller of the present invention is elucidated hereafter.

When the object unit 12 is positioned at the target position and is in the stable state, the output signal of the deviation detector 6 becomes 0 value. Therefore, the output signal passed to the deviation comparator 10 becomes less than the predetermined set limit value as a matter of course. Since, the contact "a" of the switch is connected to the contact "c", the first compensation circuit 7 is coupled to the driving amplifier 9. At this state, when the data for the new target position is applied to the target-setting unit 1 to move the object unit 12, the new data is converted into the analog signal M(n) through the first D/A converter 2. The analog signal M(n) shows n times data from the first predetermined analog signal M(1). The analog signal M(n) is applied to the deviation detector 6. In the time just before the above-mentioned state, the object unit 12 had been positioned at the previous target position. Thus, the data M(n−1) of the previous target position set by the target-setting unit 1, and the data P(n−1) of the detected position had a relation to show the following formula (1) at the previous time:

$$M(n-1) = P(n-1) \tag{1}$$

Then, as the new data M(n) of the target position is provided to the target-setting unit 1, the relation between the data M(n) of the target position and the data P(n) of the detected position changes as shown by either of the following formula (2) or (3):

$$M(n) < P(n-1) \tag{2},$$

$$M(n) > P(n-1) \tag{3}.$$

And the absolute deviation $|M(n)-P(n-1)|$ is produced in the output signal of the deviation detector 6. And, the output signal of the deviation detector 6 is applied to the first compensation circuit 7. At the same time, the output signal of the deviation detector 6 is applied to the deviation comparator 10, and is compared with the set limit value in the deviation comparator 10. The output signal of the first compensation circuit 7 is passed to the object unit 12 through the switch 11 and the driving amplifier 9. At the same time, the output signal of the first compensation circuit 7 is fed back to the analog adder 5 through the second compensation circuit 8.

When the value of the absolute deviation $|M(n)-P(n-1)|$ to be is compared with the set limit value by the deviation comparator 10 and is less than the set limit value, the contact "a" of the switch 11 is connected to the contact "c". Thus, the deviation signal output by the first compensation circuit 7 is passed to the object unit 12 through the driving amplifier 9. As a result, the object unit 12 is started for a new target position. Then, after the object unit 12 is moved, the position of object unit 12 is sent to the position detector 3 as the present value of the position data of the object unit 12. The position data is converted into an analog signal by the second D/A converter 4. The data P(n) of the detected position is applied to the deviation detector 6. And, the above-mentioned operation is repeated continuously. Finally, when the absolute deviation value $|M(n)-P(n)|$ of the output signal of the deviation detector 6 becomes 0, the driving current provided from the driving amplifier 9 to the object unit 12 becomes 0 also. Then, the object unit 12 is stopped in the stable state.

Next, for certain reasons, defects, such as, example, failure of feeding back of a detected position to the position detector 3, flow of current above a predetermined level or ceasing of current, due to troubles of the driving amplifier 9, may occur to thereby increase the absolute deviation value $|M-P|$ uninterruptedly, and hence the deviation output signal from the deviation detector (6) finally exceeds the set limit value in the deviation controller. Such a state has a liability as that which makes runaway in the system. Therefore, the output signal of the deviation comparator 10 issues a cutoff signal for the switch 11. Thereby, the contacts "a" and "c" of the switch 11 are separated, and the contact "c" is connected to the grounded contact "b". As a result, the driving amplifier 9 receives the signal 0 instead of the driving signal which is to be given through the first compensation circuit 7. Thus, the object unit 12 is stopped in safety. Thus, when the runaway of the servo control system is anticipated and judged, the object unit 12 is isolated from the system to prevent the runaway of the system.

Although the above-mentioned embodiment has been described for a servo-controller for a position control, the servo-controller of the present invention is able to apply to other objects, for example, flux, voltage, electric current, revolution or speed control as a matter of course.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A servo-controller comprising:
   a target-setting means for setting a target value for an object unit to be controlled;
   a position detecting means which produces a position feed-back signal by detecting the present value of said object unit;
   a deviation detecting means which produces a deviation signal by comparing said position feed-back signal with said target value;
   a driving means for driving said object unit by utilizing said deviation signal as its control signal;
   a comparator for comparing said deviation signal with a predetermined set limit value, and for stopping operation of said driving means when said deviation signal is more than said predetermined set limit value; and
   a switch means responsive to said comparator for switching said driving means into ground level when said deviation signal is more than said predetermined set limit value.

2. A servo-controller according to claim 1, further comprising:
   a first compensation circuit for receiving said deviation signal from said deviation detecting means and outputting a first compensated deviation signal to said driving means.

3. A servo-controller according to claim 2, further comprising:

a second compensation circuit for receiving said first compensated deviation signal and outputting a twice compensated deviation signal to said deviation detecting means.

4. A servo-controller according to claim 1, wherein a target value which is a digital data of 12 bits is provided every fixed predetermined period of time by said target-setting means.

5. A servo-controller comprising:

a target-setting means for setting a target value for an object unit to be controlled;

a position detecting means which produces a position feed-back signal by detecting the present value of said object unit;

a deviation detecting means which produces a deviation signal by comparing said position feed-back signal with said target value;

a driving means for driving said object unit by utilizing said deviation signal as its control signal;

a comparator for comparing said deviation signal with a predetermined set limit value; and, switch means for stopping operation of said driving means when said deviation signal is more than said predetermined set limit value.

6. A servo-controller according to claim 5, further comprising:

a first compensation circuit for receiving said deviation signal from said deviation detecting means and outputting a first compensated deviation signal to said driving means.

7. A servo-controller according to claim 6, further comprising:

a second compensation circuit for receiving said first compensated deviation signal and outputting a twice compensated deviation signal to said deviation detecting means.

8. A servo-controller according to claim 5, wherein a target value which is a digital data of 12 bits is provided every fixed predetermined period of time by said target-setting means.

* * * * *